United States Patent [19]

Bharathan et al.

[11] Patent Number: 5,661,670
[45] Date of Patent: Aug. 26, 1997

[54] METHOD AND SYSTEM FOR SIMULATING HEAT AND MASS TRANSFER IN COOLING TOWERS

[75] Inventors: Desikan Bharathan, Lakewood; A. Vahab Hassani, Golden, both of Colo.

[73] Assignee: Midwest Research Institute, Kansas City, Mo.

[21] Appl. No.: 452,584

[22] Filed: May 25, 1995

[51] Int. Cl.$^6$ ........................................... G09B 9/00
[52] U.S. Cl. ........................................ 364/578; 395/500
[58] Field of Search ........................... 395/500; 364/578, 364/148, 152, 188; 210/696; 422/53

[56] References Cited

U.S. PATENT DOCUMENTS

| | | | |
|---|---|---|---|
| 4,085,594 | 4/1978 | Mayer | 62/171 |
| 4,599,217 | 7/1986 | Winston et al. | 422/53 |
| 4,613,952 | 9/1986 | McClanahan | 364/578 |
| 4,992,380 | 2/1991 | Moriarty et al. | 436/55 |
| 5,040,377 | 8/1991 | Braun et al. | 62/183 |
| 5,241,461 | 8/1993 | Georges | 364/148 |
| 5,370,799 | 12/1994 | Oddo et al. | 210/696 |
| 5,407,606 | 4/1995 | Bowman | 261/109 |
| 5,415,783 | 5/1995 | Johnson et al. | 210/699 |
| 5,474,832 | 12/1995 | Massey | 428/182 |
| 5,480,594 | 1/1996 | Wilkerson et al. | 261/109 |

OTHER PUBLICATIONS

D. Bharathan, B.K. Parsons and J.A. Althof, Direct–Contact Condensers for Open–Cycle OTEC Applications, Model Validation with Fresh Water Experiments for Structured Packings, Oct. 1988, SERI/TP–252–3108.

*Primary Examiner*—Kevin J. Teska
*Assistant Examiner*—Stephen J. Walder, Jr.
*Attorney, Agent, or Firm*—Edna M. O'Connor; Ken Richardson

[57] ABSTRACT

The present invention is a system and method for simulating the performance of a cooling tower. More precisely, the simulator of the present invention predicts values related to the heat and mass transfer from a liquid (e.g., water) to a gas (e.g., air) when provided with input data related to a cooling tower design. In particular, the simulator accepts input data regarding: (a) cooling tower site environmental characteristics; (b) cooling tower operational characteristics; and (c) geometric characteristics of the packing used to increase the surface area within the cooling tower upon which the heat and mass transfer interactions occur. In providing such performance predictions, the simulator performs computations related to the physics of heat and mass transfer within the packing. Thus, instead of relying solely on trial and error wherein various packing geometries are tested during construction of the cooling tower, the packing geometries for a proposed cooling tower can be simulated for use in selecting a desired packing geometry for the cooling tower.

32 Claims, 12 Drawing Sheets

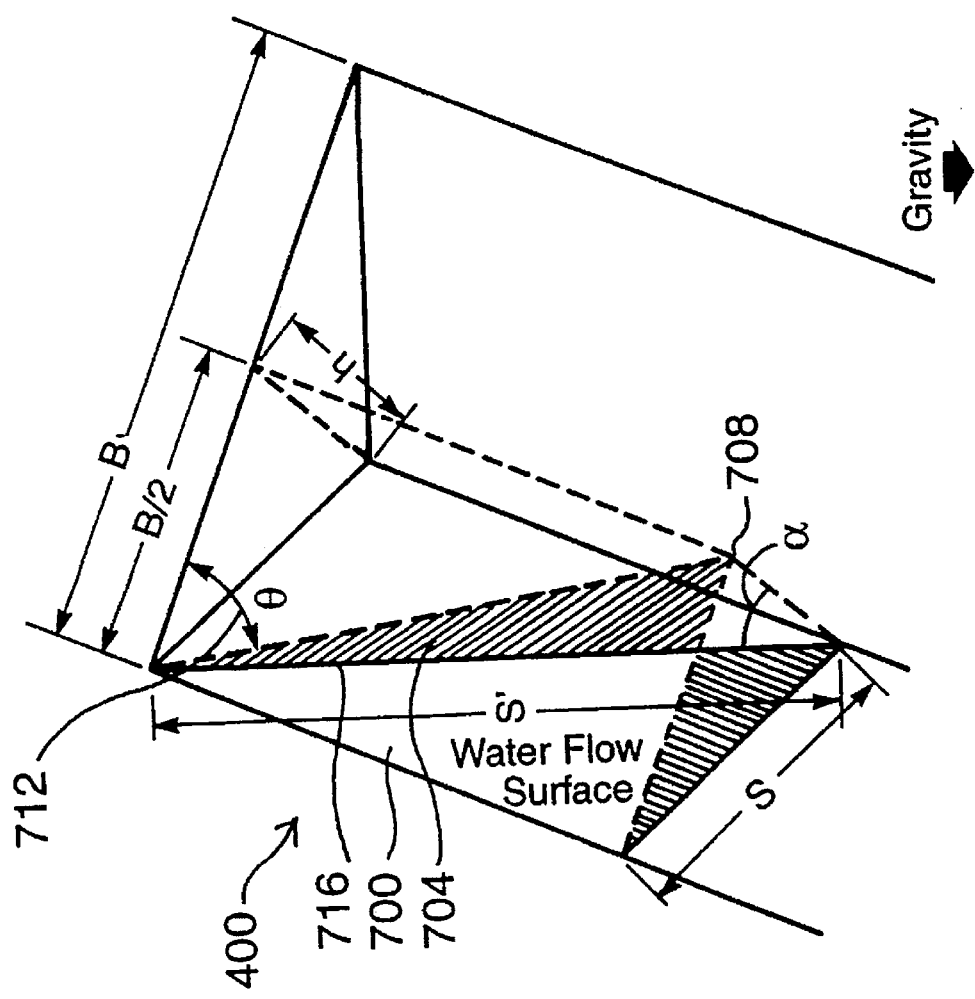
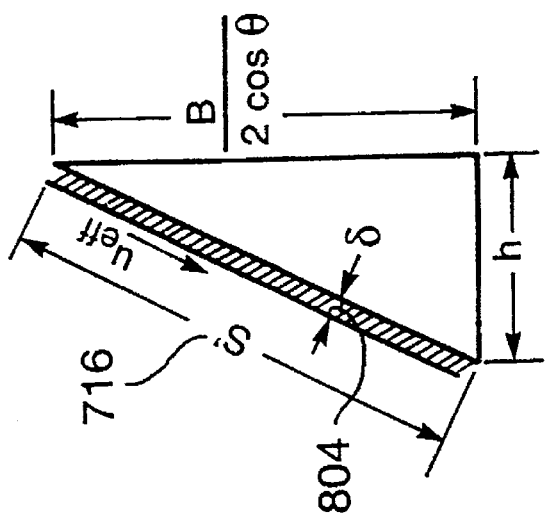
FIG. 7.
FIG. 8

CALC-COEFFICIENTS (CON'T)

METHOD AND SYSTEM FOR SIMULATING HEAT AND MASS TRANSFER IN COOLING TOWERS

FIELD OF THE INVENTION

The present invention relates to simulating heat and mass transfer between a liquid and gas within a cooling tower and, in particular, to predicting the performance of various cooling tower packing geometries.

BACKGROUND OF THE INVENTION

In many energy generation and chemical processing plants, there is a need to dissipate excess heat from a liquid and, in particular, from excessively heated water. One widely used technique for dissipating such excess heat is through the use of a cooling tower wherein the heated liquid, usually water, is sprayed into an upper portion of the cooling tower and allowed to traverse the vertical length of the tower while a gas, usually air, is also circulated through the cooling tower whereby the contact between the water and the air induces a heat and mass transfer such that heat and vapor from the water are carried away with the exhaust air exiting the cooling tower.

A key factor in designing cooling towers for obtaining efficient heat and mass transfer is to provide a large surface area that is continually wetted by, for example, water and over which a gas (e.g., air) can continually circulate. To provide such large surface areas, packings (also denoted structured packings) are used wherein each such packing has a plurality of interleaved channels that provide liquid and gas communication vertically through the packing. The channels provide most of the surface area by which the liquid and gas come in contact to increase the heat and mass transfer. In one typical configuration, one or more packings span a cross section of the interior of a cooling tower such that: (a) the liquid inlet is above the packing thereby allowing the liquid to be cooled to fall onto the packing and traverse the packing channels in flows having large exposed surface areas, and (b) concurrently with (a), a gas, typically air, is drawn upwardly from beneath the packing through the packing channels thereby cooling the liquid within the packing by evaporation as the air moves counter to the flow of the liquid.

The design or structure of a packing for a cooling tower has heretofore been determined solely by packing designer's experience together with trial and error. That is, packing designers familiar with the results obtained from packings used in previously built cooling towers have heretofore made educated guesses as to an acceptable packing design for a new cooling tower. However, there are a large number of factors which may significantly affect the effectiveness of the packing and thus the performance of the cooling tower, for example, the ambient temperature and humidity of the cooling tower site, the air and water flow rates through the cooling tower, the water inlet temperature and the geometry of the channels through the packing itself. Thus, without an understanding of the fundamental physics of heat and mass transfer within the proposed packing designs, packing designers have resorted to trial and error to determine which educated guess for a packing design performs satisfactorily given the cooling tower and site characteristics.

The above described packing design methodology has the following disadvantages:

(a) the determination of an optimal or near optimal packing design can be cost and/or time prohibitive in that substantial time and resources can be expended in constructing, installing and testing each candidate packing design; and (b) advancement in packing design has been inhibited in that there is no tool allowing easy simulation of cooling tower performance with different packing designs.

Thus, it would be advantageous to have a cooling tower simulation tool to predict the performance of the cooling tower according to input packing geometric characteristics. More precisely, it would be advantageous to have a simulation tool which uses the environmental characteristics of the cooling tower site, cooling tower performance constraints as well as the geometric characteristics of the packing for predicting the performance of the packing in facilitating heat and mass transfer between a liquid and gas and more particularly between water and air.

SUMMARY OF THE INVENTION

The present invention is a system and method for predicting the performance of a cooling tower regarding heat and mass transfer between a liquid and a gas, wherein the liquid is usually water but may be, for example, monoethanolamine or caustic (NaOH) solution, and, the gas is usually air but maybe, for example, $NH_3$, $CO_2$ or $H_2S$. In particular, the present invention uses inputs describing geometric characteristics of a packing included in the cooling tower and performs computations derived from the fundamental equations of physics for heat and mass transfer to predict the packing performance within the cooling tower. Thus, the present invention yields as output various measurements related to the performance of the cooling tower including the following cooling tower measurements: an outlet liquid temperature, an output liquid flow rate, a heat load, a total pressure, and pressure losses.

Note that some common cooling tower packing types are packings sold under the brand name PLASdek by Munters as well as and packings sold by KOCH. Such packings have substantially vertical corrugated layers or sheets arranged to increase the surface area upon which heat and mass transfer can occur from the liquid to the gas. The sheets are arranged such that the corrugations of adjacent vertical sheets are angled in relation to one another thus providing interleaved channels in the packing allowing liquid and gas to pass through the height of the packing during cooling tower operation. In using the present invention, hereinafter denoted a "simulator," to predict the performance of such a packing, the following parameters related to the packing geometry are input to the simulator: the external dimensions of the packing (e.g., height and diameter), the dimensions of the channels within the packing and a measurement related to the angle of the channels from the horizontal.

Additionally, the simulator Of the present invention uses, as input, measurements related to the cooling tower site and to the cooling tower operating characteristics. In particular, when the liquid is substantially water and the gas is substantially air (as is typically the case), then the cooling tower site measurements are: cooling tower wet and dry bulb air inlet temperatures, a water inlet temperature and an inlet air pressure. Further, regarding the operating characteristics, the following measurements are input: a cooling tower air mass flow rate (also denoted air loading), the cooling tower liquid or water mass flow rate (also denoted water loading). Also note that analogous measurements can also be supplied for towers using a liquid other than substantially water and/or a gas other than substantially air for absorbing the gas or scrubbing a gaseous component. Thus, hereinafter whenever water and/or air is referred to, it is assumed that one skilled in the art can determine analogous terms for his/her liquid and gas. Therefore, no limitation is intended or implied by the use of the words "water" for "liquid" and "air" for "gas".

Once a set of inputs as described above are supplied to the simulator of the present invention, an analysis step or module is performed wherein integration steps or modules along the height of the cooling tower packing are performed, each such integration using fundamental physical properties of gas-liquid interactions in conjunction with the gas and liquid loadings and the geometry of the packing for determining measurements relating to the heat and mass transfer from the liquid to the gas. That is, each integration step or module is performed on a single packing cross-sectional slice along the packing height so that the heat and mass transfer analysis results from each packing slices can be accumulated providing a final result yielding a prediction for at least the following cooling tower characteristics: outlet water flow rate, heat load (i.e., a rate of heat dissipated from the cooling tower), air outlet stream flow rate, outlet air dry bulb temperature, outlet air wet bulb temperature, total pressure (i.e., ambient pressure minus the loss in pressure at the air outlet), outlet water temperature, air outlet partial pressure of steam and a number of transfer units (i.e., representing the efficiency of the heat and mass transfer process) and fog flow rate.

Since the air flow and the water flow in a cooling tower are in opposite directions (i.e., counter-current flow), it is a further aspect of the present invention to estimate the water parameter values at the water outlet(s) below the packing and to use the water output estimates for calculating the cooling tower characteristics mentioned above. In particular, the inlet water characteristics are computed even though they are also known or predetermined from the cooling tower design. Thus, these computed or predicted water values may be compared with the corresponding known input water values. If the comparison or difference between the predicted inlet water values and the known inlet water values is outside a predetermined range, then new estimated outlet water values are used and the analysis step or module is performed again using the newly estimated values. Alternatively, if the comparison or difference is within the predetermined range of values, then the integration step or module is not reactivated with new estimated values since the heat and mass transfer measurements output from the integration are deemed reliable. Thus, it is a further aspect of the present invention, when predicting the performance of a counter-current flow cooling tower to iteratively perform the analysis step or module until inlet water values output by the analysis converge to related simulator input (i.e., known) values for inlet water, the convergence being the criteria for determining when reliable heat and mass transfer predictions have been obtained.

As a further aspect of the present invention, the simulator is advantageously used on a plurality of data sets for cooling tower configurations wherein each data set supplies all necessary input values for execution of the simulator in predicting the performance of a related cooling tower configuration. Thus, the simulator of the present invention may be used iteratively with various configurations of input values as a technique for at least deleting from any further consideration the cooling tower designs in which the simulator predicts poor performance of the cooling tower.

Other features and benefits of the present invention will become apparent from the detailed description and the accompanying figures contained hereinafter.

BRIEF DESCRIPTION OF THE DRAWINGS

The file of this patent contains a black and white photograph. Copies of this patent with the black and white photograph will be provided by the United States Patent and Trademark Office upon request and payment of the necessary fee.

FIG. 7 shows various geometry related parameters governing the heat and mass transfer within a channel 400;

FIG. 8 is an additional view of the triangle 704 from FIG. 7, wherein the water film thickness 804 is illustrated as the water flows down surface 700;

DETAILED DESCRIPTION

Figure 1:
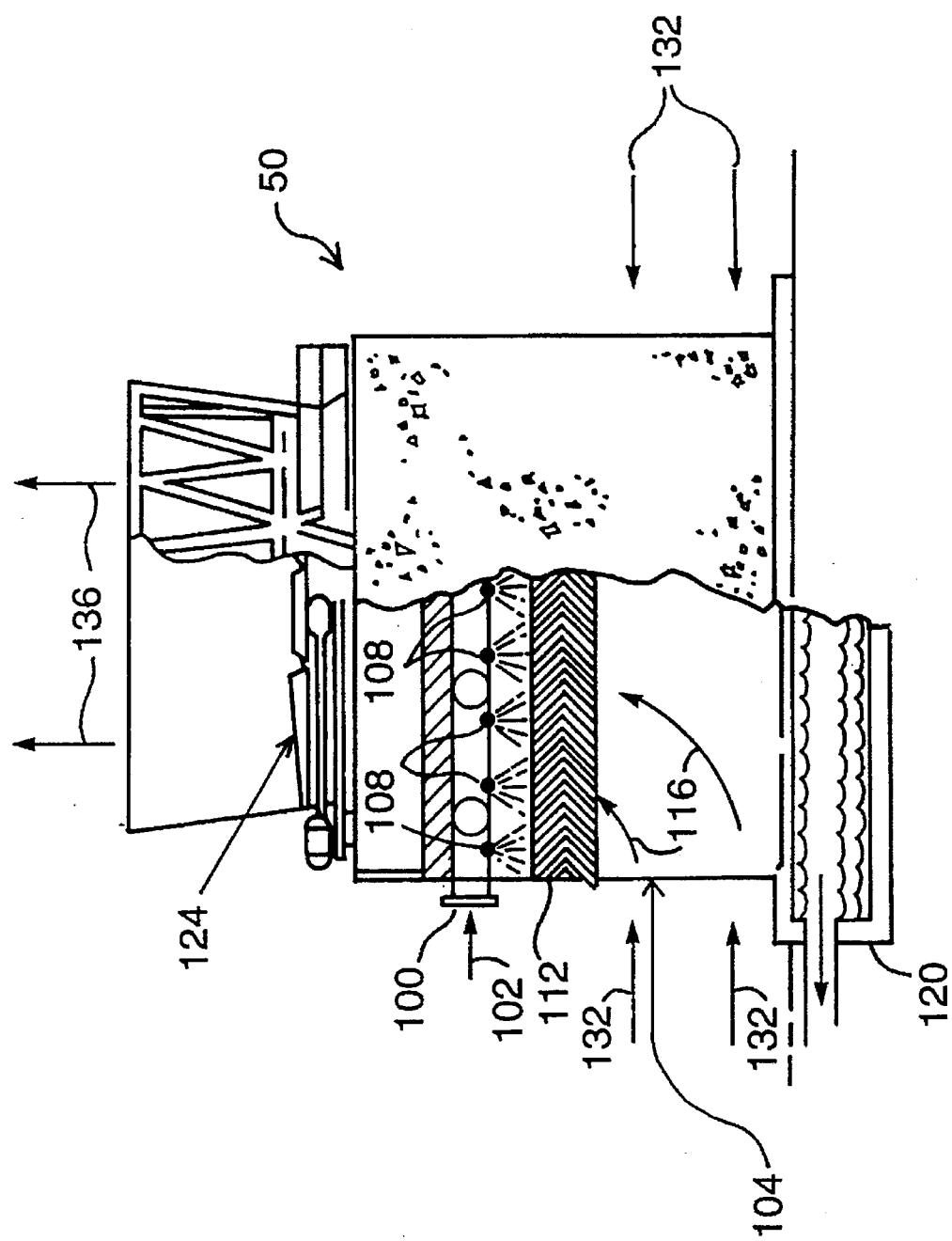
FIG. 1 presents a high level diagram of a cooling tower 50 whose heat and mass transfer performance can be simulated by the present invention.

Referring to FIG. 1, a representation of a cooling tower 50 is given. The purpose of the cooling tower 50 is to reduce the temperature of a hot stream of water (more generally a liquid) which is input to the cooling tower 50 via water inlet 100 as indicated by water flow arrow 102. The cooling of the water is accomplished by raising the temperature of the air entering the cooling tower 50 through, for example, a lower portion 104 of the tower. That is, as the air traverses the interior of the cooling tower 50, it evaporates a portion of the input hot water as the water falls by gravity from sprayers 108. The efficiency of the heat and mass exchange between the input water and the air depends on such characteristics as the humidity of the input air and the water surface area exposed to the air circulating through the cooling tower 50. To increase the exposed water surface area, the water is usually sprayed onto a packing 112 within the tower 50. The packing 112 provides a large internal surface area upon which heat and mass transfer can take place from the water to the air. In providing for the heat and mass transfer, the packing 112 includes, in one common type, arrangements of thin sheets of a material such as sheet metal or plastic such that interleaved channels are formed through the height of the packing whereby the air and the water flow over the large surface area provided by the channels. Thus, the presence of the packing 112 both spreads the water (liquid) over the packing's large internal surface area and, in addition, retards the rate of fall of the water droplets from the sprayers 108 to the collection basin 120. This provides more time for the water to be exposed to the cooling air stream entering through the lower portion 104 (as indicated by air flow arrows 116), this air stream being pulled through the cooling tower by exhaust fan 124. Thus, as one skilled in the art readily deduces, it is desirable to have not only a maximum of wetted surface within the packing 112 but also a minimum of air resistance and pressure drop as the air traverses the interior of the packing. Further, as will also be understood by one skilled in the art, the performance of cooling tower. 50 is evaluated based on, for instance, the water exit temperature and the wet bulb temperature of the air entering the cooling tower wherein the lower the water exit temperature for a given wet bulb temperature, the better the performance of the cooling tower since the wet bulb temperature of the entering air is the minimum temperature to which the cooling tower water may be cooled in an ideal cooling tower.

Figure 2:
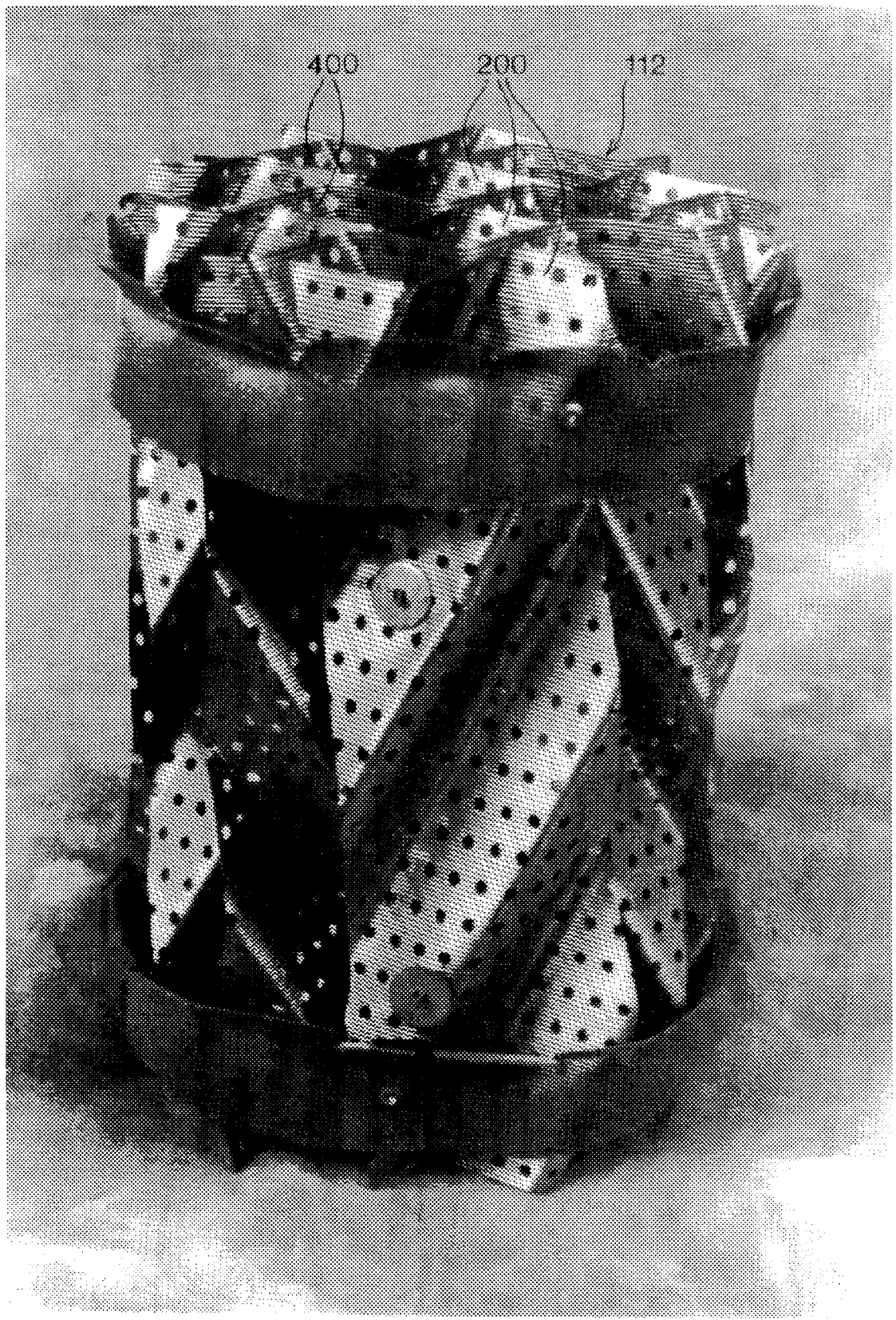
FIG. 2 is an illustration of a cooling tower packing 112 whose performance may be simulated by the present invention.
Figure 3:
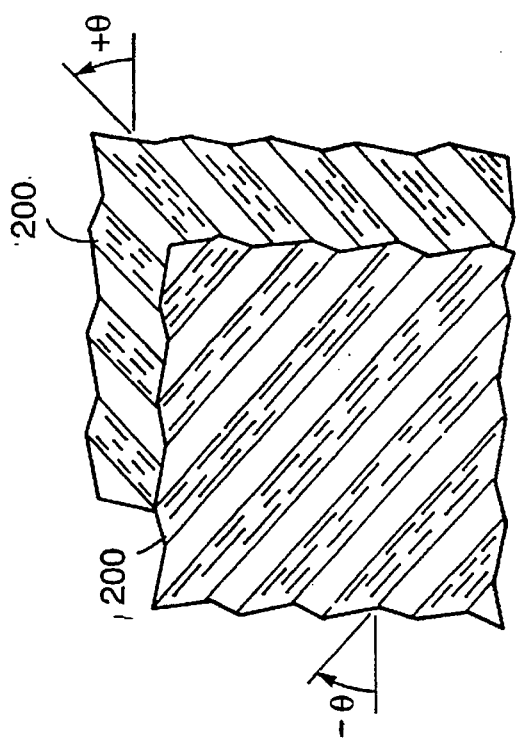
FIG. 3 illustrates the orientation of two adjacent sheets 200 as they would appear in packing 112.
Figure 4:
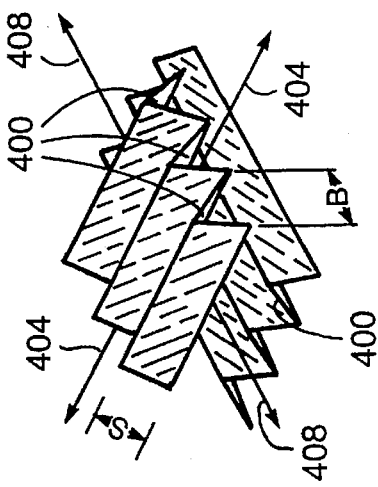
FIG. 4 provides an oblique view of two adjacent sheets 200 of the packing 112.

Referring now to FIGS. 2–6, greater detail is provided regarding one particularly useful packing 112 to which the simulator of the present invention applies, namely, a packing by KOCH, Inc. In FIG. 2, where such a packing 112 is presented, the packing is made of adjacent layers of corrugated sheets 200 bound together. The sheets may be made of metallic or plastic solid sheets or a gauze (wire mesh) sheets. In FIGS. 3 and 4, the orientation of adjacent corrugated sheets 200 in packing 112 is shown. In particular, note that the sheets 200 are arranged in the packing 112 such that consecutive sheets have a different corrugation inclination. That is, one such sheet 200 has its corrugations at an angle of +θ from the horizontal while the other has its corrugation at an angle of −θ. This arrangement within packing 112 allows the water from sprayers 108 to flow through interleaved passageways or channels 400 that traverse through the height of the packing 112 such that the water redistributes as it flows through the packing 112. Further, this arrangement provides a relatively straightforward flow path for the air through the packing.

As best shown in FIG. 4, channels 400 may be further decomposed into those channels providing passageways through the packing height along the direction arrows 404 and those channels providing passageways through the packing height along the direction arrows 408. Further, note that channels 400 with different direction arrows 404 and 408 intersect. Thus, the cross-section of a channel 400 varies depending on whether the channel opens into another channel having a different direction arrow or not.

Figure 6:
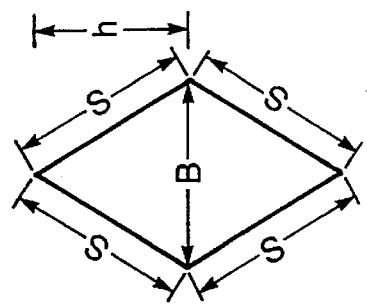
FIG. 6 shows a different cross-sectional view of a channel 400 wherein the cross-section is taken at a different position along the channel 400 from the cross-section illustrated in FIG. 5.
Figure 5:
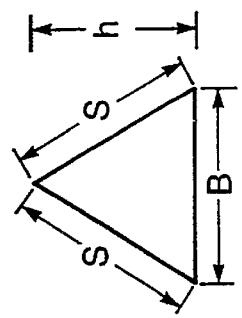
FIG. 5 shows a first cross-sectional view of a pathway or channel 400 within the packing 112 through which air and water flow.

FIGS. 5 and 6 illustrate the two cross-sections that occur within the channels 400. FIG. 5 is the cross-section that occurs where the corrugated sheets 200 come into contact. FIG. 6 is the cross-section where two channels 400 having different direction arrows 404 and 408 open into one another. Thus, these two cross-sections alternate through each channel 400 thereby periodically redistributing the air and water flows through the channels. Further note that it is an aspect of the present invention to use the geometry of the channels 400 and in particular the geometry of their cross-sections (as well as the inclination angle θ) to calculate heat and mass transfer related to measurements between the air and water as is described further below. In particular, the cross-sectional dimensions used by the present invention are:

S=the width of each corrugation of a sheet 200 (note S denotes the "side" of a channel 400 cross-section);

B=the length between two consecutive corrugation ridges on a sheet 200 (note B is denoted the "base" of the cross-sections of channel 400); and h=the height of the corrugations for a sheet 200.

In addition to the geometric characteristics discussed above, FIGS. 7 and 8 illustrate other characteristics which are used as input to the simulator of the present invention. FIG. 7 shows a portion of a channel 400 of the packing 112. As shown, the water moves down by gravity through the channel 400. The water flows as a film on a surface inclined vertically, i.e., surface 700 as shown in FIG. 7. Thus, as shown in FIGS. 7 and 8, the following additional characteristics are used by the simulator of the present invention:

$$S' = \text{the water renewal length 716}$$
$$= \left(\left(\frac{B}{2\cos\theta}\right)^2 + h^2\right)^{1/2}$$

$\delta$ = water film thickness 804;

$\alpha$ = modified inclination of the surface 700 from the horizontal 708.

Figure 9:
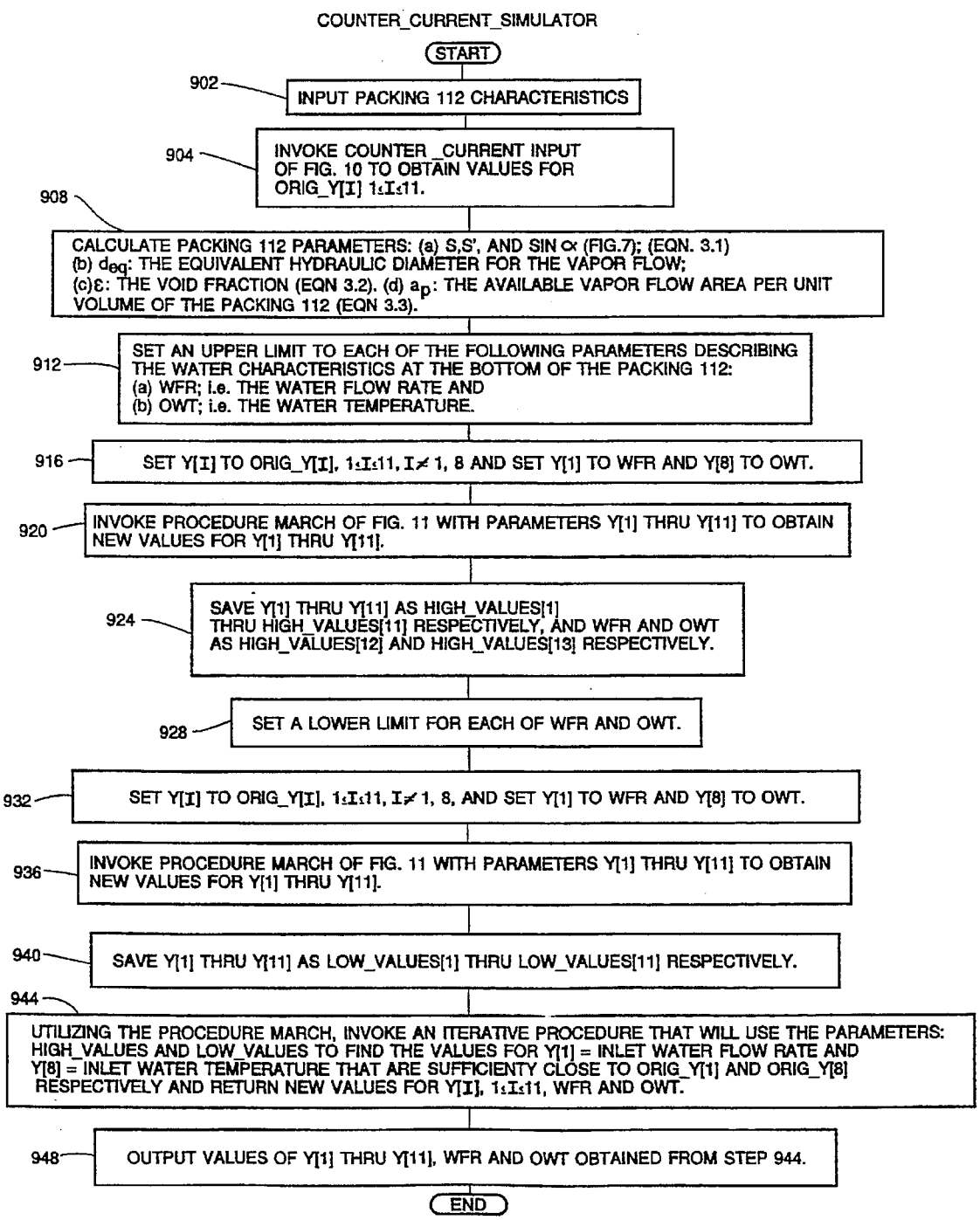
FIG. 9 is a high level flowchart describing the steps performed by the main program of the simulator of the present invention.

FIGS. 9–15 present a high level description of the steps performed by the simulator of the present invention. In particular, FIG. 9 presents a flowchart of the highest level routine of the simulator while each successive flowchart describes the steps of procedures which are called by the program corresponding to the flowchart of FIG. 9.

Before proceeding to the details of the above-mentioned flowcharts, it is worthwhile to describe the inputs and outputs to the simulator of the present invention as well as the general strategy as to how the simulator determines the output values from the input values. Accordingly, the following input values are used:

inlet water (liquid) mass flow rate;

inlet air (gas) mass flow rate;

inlet water (liquid) temperature;

inlet air (gas) wet bulb temperature;

inlet air (gas) dry bulb temperature;

inlet air (gas) pressure; and packing 112 geometry values such as S, S', B, h, δ, and α.

Subsequent to the input of the above input values, the simulator of the present invention calculates and outputs at least the following values:

(i) outlet water flow rate (kg/s);

(ii) total cooling tower 50 heat load (kW);

(iii) outlet dissolved gas flow rate (kg/s);

(iv) outlet steam flow rate, i.e., moisture flow rate (kg/s);

(v) outlet dry bulb temperature of the outlet air mixture (° C.);

(vi) outlet air mass flow rate (kg/s);

(vii) outlet cooling tower 50 pressure (Pa);

(viii) outlet water temperature (° C);

(ix) outlet partial pressure of the steam (Pa);

(x) number of energy transfer units, denoted NTU; and (xi) outlet fog flow rate (kg/s).

To determine the above eleven output values, the simulator performs various integrations along the height of the packing 112. More precisely, the packing 112 is partitioned into packing slices along its height and in each of the slices. The relevant transfer equations are integrated from the bottom of the slice to the top of the slice. This integration results in parameters related to the above mentioned output valves having values describing the performance of the portion of the packing 112 from the bottom of the packing to the top of the last slice that has been integrated. Accordingly, in order to obtain the above eleven output values, related parameters used by the simulator for accumulating the output values are as follows:

Y[1]=water flow rate (kg/s);

Y[2]=tower heat load (kW);

Y[3]=dissolved gas flow rate (kg/s);

Y[4]=steam flow rate, i.e., moisture flow rate (kg/s);

Y[5]=dry bulb temperature of the humid air mixture (° C.);

Y[6]=air mass flow rate (kg/s);

Y[7]=cooling tower pressure (Pa);

Y[8]=water temperature (° C.);

Y[9]=partial pressure of the steam (Pa);

Y[10]=NTU; and

Y[11]=fog flow rate (kg/s).

Figure 10:
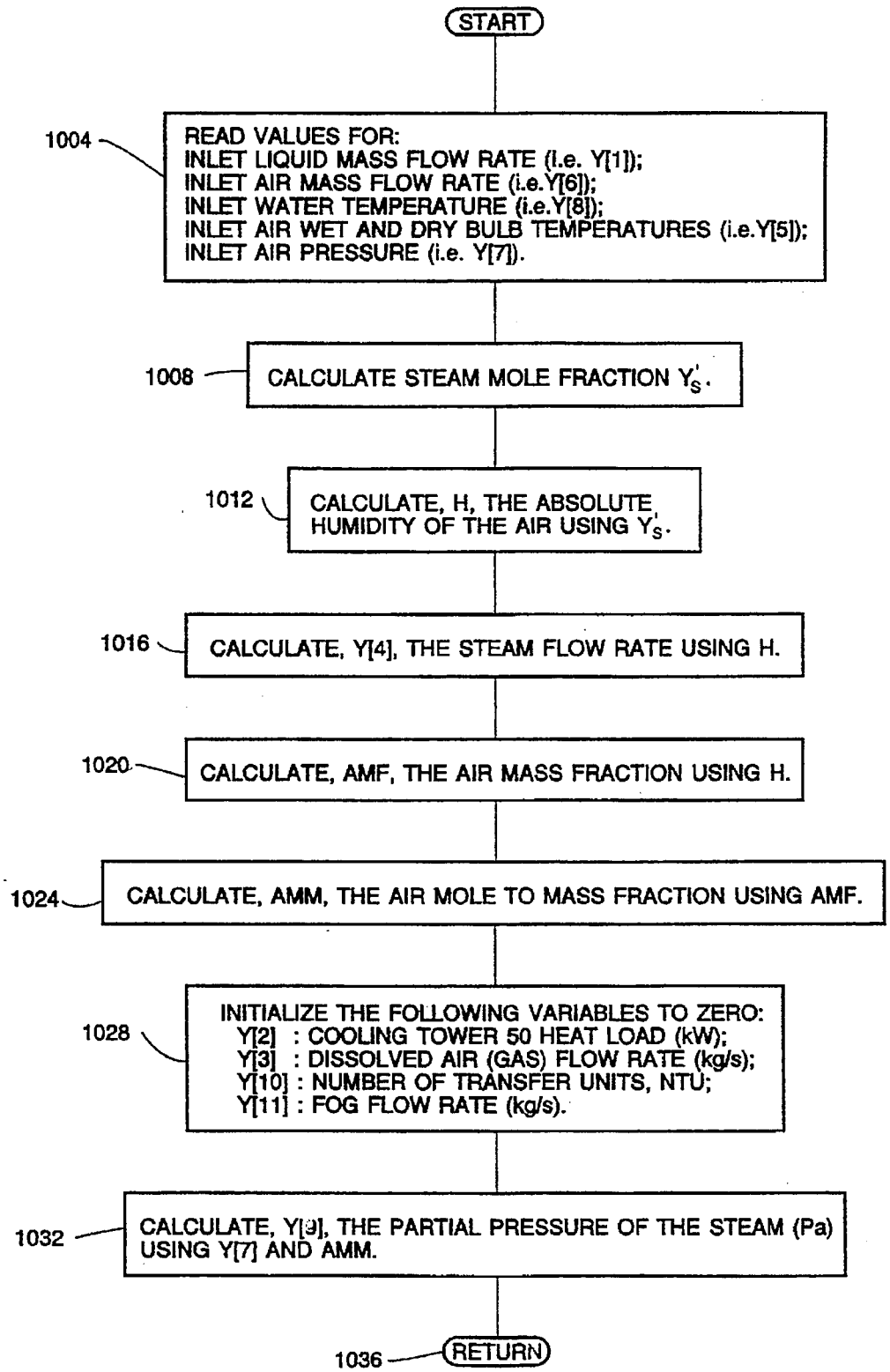
FIG. 10 is a flowchart of the steps performed in initializing cooling tower characteristics to values for the bottom of the packing 112.

Referring now to FIG. 9, in step 904, the procedure "COUNTER_CURRENT_INPUT" of FIG. 10 is invoked to obtain an array, "ORIG_Y", of eleven initial values to be used in integrating the height of the packing 112. In particular, the array, ORIG_Y, contains initialization values for commencing the integration process as well as some values for indicating when the simulator should terminate a particular simulation due to an acceptable tolerance being obtained. More precisely, the elements of the array ORIG_Y may be interpreted as follows:

ORIG_Y[1]=inlet water flow rate (kg/s);

ORIG_Y[2]=tower heat

ORIG_Y[3]=dissolved gas flow rate (kg/s);

ORIG_Y[4]=steam flow rate, i.e., moisture flow rate (kg/s);

ORIG_Y[5]=inlet dry bulb temperature of the humid air mixture (° C);

ORIG_Y[6]=inlet air mass flow rate (kg/s);

ORIG_Y[7]=inlet cooling tower pressure (Pa);

ORIG_Y[8]=inlet water temperature (° C);

ORIG_Y[9]=partial pressure of the steam (Pa);

ORIG_Y[10]=NTU; and

ORIG_Y[11]=fog flow rate (kg/s).

Subsequently, in step 908, a number of packing 112 geometry parameters are initialized. In particular, the following packing geometry parameters are initialized:

(a) S, S' and sin α from FIG. 7;

(b) $d_{eq}$; i.e., the equivalent hydraulic diameter for the vapor flow as determined in Equation 3.1 of section II below;

(c) ε; i.e., the void fraction of the packing 112 as determined in Equation 3.2 of section II; and (d) $a_p$; i.e., the available vapor surface flow area per unit volume of the packing 112 as determined in Equation 3.3 of section II.

Note that in integrating from the bottom of the packing 112 to its top, initial values for the water flow rate and the water temperature are required at the bottom of the packing. However, both are unknown and must be estimated in order to commence the analysis process along the height of the packing 112. Accordingly, the values calculated for simulation parameters corresponding to the top of the packing 112 are therefore estimates which are dependent upon the water characteristics initially assumed at the bottom of the packing. However, it is important to note that the water flow rate and water temperature at the top of the packing are known since these are input values obtained in step 904. Thus, by performing the simulation of the packing using values for the water characteristics at the bottom of the packing which are at the upper limit of their potential range and subsequently performing the simulation of the packing 112 wherein the water characteristics at the bottom of the packing have values at the lower end of their potential range, a numerical convergence procedure is used to find values for the water characteristics at the bottom of the packing which result in calculated values at the top of the packing wherein the calculated water flow rate and water temperature at the top of the packing are within a predetermined tolerance of the known input values for these variables. In fact, this strategy is embodied in the steps 912 through 944 of FIG. 9 as will now be discussed.

Figure 11:
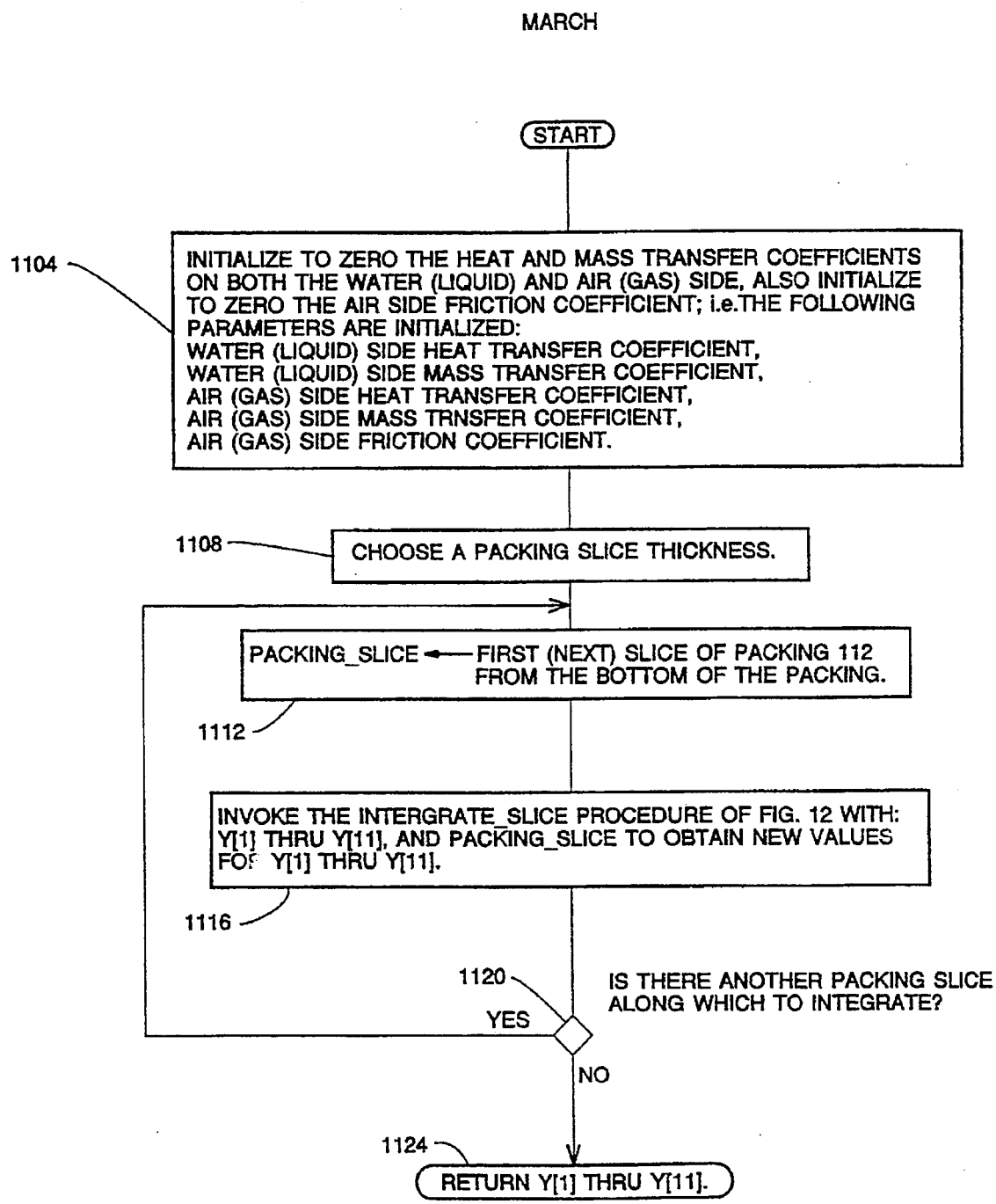
FIG. 11 is a flowchart describing the steps used in iteratively selecting a packing slice to be integrated and accumulating values for the parameters predicting cooling tower performance.

In step 912, the variables "WFR" and "OWT" corresponding respectively to the water flow rate and the outlet water temperature at the bottom of the packing, are assigned values which are at the upper limits of their ranges. Subsequently, in step 916, the array Y is initialized with values corresponding to the bottom of the packing 112. Following this in step 920, the procedure MARCH of FIG. 11 is invoked with the array Y for the purpose of integrating successive horizontal packing slices from the bottom of the packing to the top and thereby obtaining new values for the array Y which correspond to the top of the packing. Subsequently, in step 924 the newly obtained Y values and the water characteristics at the bottom of the packing upon which these new Y values depend are saved in the array "HIGH_VALUES". Next, in step 928, low limits are assigned to each of the variables WFR and OWT. Subsequently, in steps 932 through 940 the array Y is reinitialized (using the lower limits for the water characteristics), the procedure MARCH is once again invoked to again calculate new values for the array Y and the resulting new values for the array Y along with the lower limit values for the water characteristics at the bottom of the packing are saved in the array "LOW_VALUES".

Subsequently in step 944, provided the calculated HIGH_VALUES and LOW_VALUES in the WFR and OWT bracket the given input value for the water inlet flow rate and temperatures, any of a number of iterative convergence procedures, as are well known in the art, may be invoked to obtain water characteristics at the bottom of the packing which result in computed values (via the procedure MARCH) at the top of the packing wherein the computed water characteristics are sufficiently close to the known input water characteristics as provided in ORIG_Y[1] and ORIG_Y[8]. Thus, when step 944 completes, the last set of values in the array Y for the top of the packing 112 and the resulting values of WFR and OWT which allowed convergence constitute the desired output for the simulator. Finally, in step 948 are the desired value, and are output or displayed as the results of the simulation.

In FIG. 10, a flowchart is presented for the procedure COUNTER_CURRENT_INPUT invoked in step 904 of FIG. 9. In step 1004 of this figure, the following values are input (preferably from a file):

(i) inlet liquid mass flow rate (i.e., Y[1]);

(ii) inlet air mass flow rate (i.e., Y[6]);

(iii) inlet water temperature (i.e., Y[8]);

(iv) inlet air wet bulb temperature; This quantity is a function of air pressure Y[7] and the steam flow carried by the air.

(v) inlet air dry bulb temperature (i.e., Y[5]); and (vi) inlet air pressure (i.e., Y[7]).

In step 1008, the steam mole fraction $Y_s'$ is calculated using the following equation:

$$Y_s' = \frac{\text{saturation pressure at inlet dewpoint}}{Y[7]}$$

wherein the saturation pressure is calculated using Equation 4.8 of section II.

Subsequently, in step 1012, the absolute humidity, H, of the air is calculated using $Y_s'$ according to the following equation:

$$H = \frac{Y_s'}{1 - Y_s'} * \frac{M_s}{M_a}$$

wherein $M_s$=the molecular weight of steam, and $M_a$=the molecular weight of the air.

Following this, in step 1016, the steam flow rate, Y[4], for the bottom of the packing 112 is calculated using the following formula:

$$Y[4] = Y[6]*H$$

Subsequently, in step 1020, the air mass fraction, AMF, is calculated according to the following equation:

$$AMF = \frac{1}{1+H}.$$

Next, in step 1024, the air mole to mass fraction, AMM, is calculated using the following equation:

$$AMM = \left(\frac{AMF}{M_a}\right) / \left(\frac{AMF}{M_a} + \frac{1-AMF}{M_s}\right).$$

In step 1028, the following variables (which currently indicate values for the bottom of the packing 112) are initialized to zero:

(i) Y[2]; i.e., the cooling tower 50 heat load (kw);

(ii) Y[3]; i.e., the dissolved air (gas) flow rate (kg/s);

(iii) Y[10]; i.e., the number of transfer units, NTU; and (iv) Y[11]; i.e., the fog rate (kg/s).

In step 1032, the partial pressure of the steam, Y[9], for the bottom of the packing 112 is calculated using the following equation:

$$Y[9] = Y[7]*(1-AMM).$$

Thus, since all eleven elements of the array Y now have values, the return step 1036 is encountered for returning these eleven values to the main program of FIG. 9.

Figure 12:
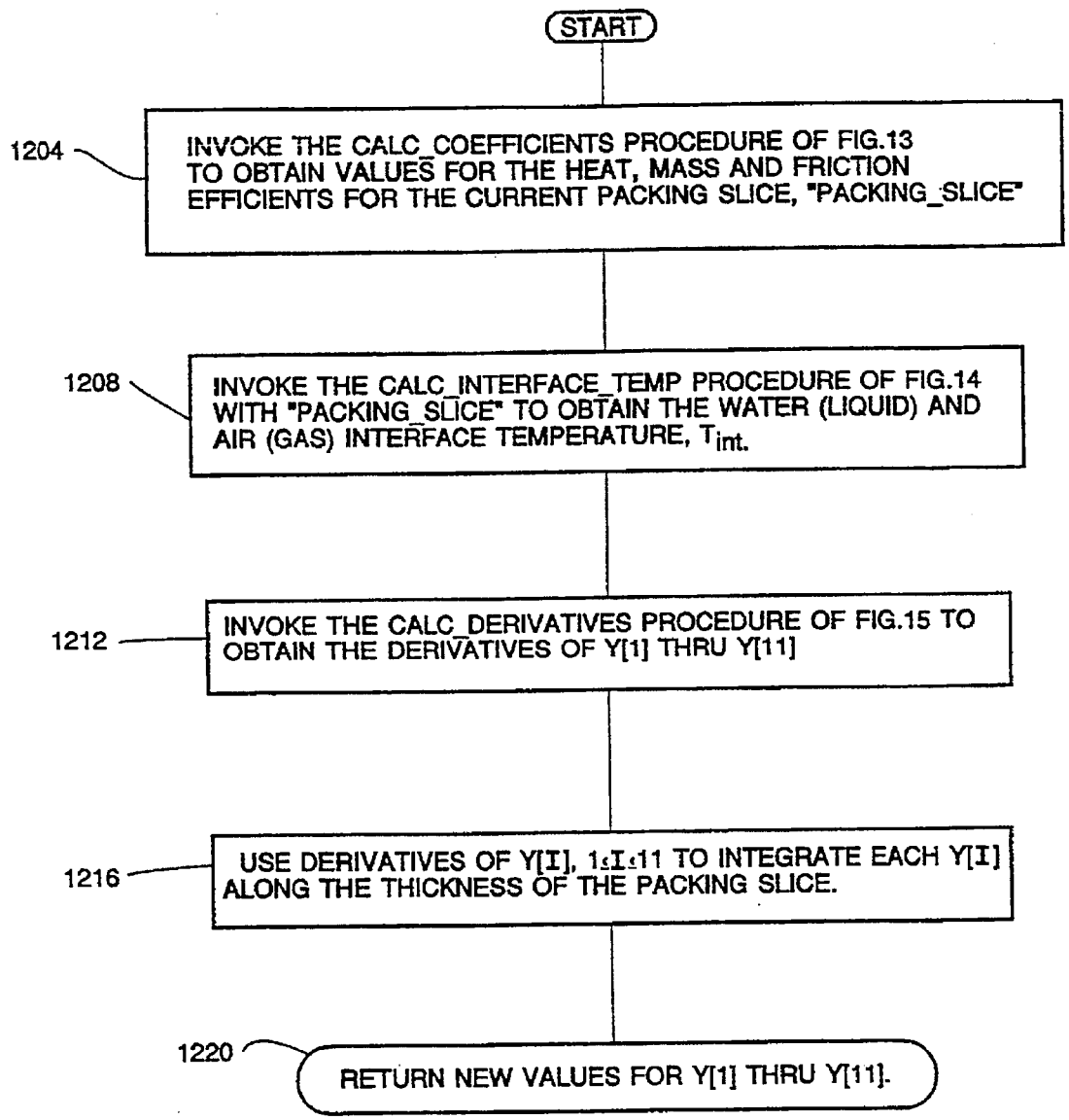
FIG. 12 is a high level flowchart of the steps performed in integrating a packing slice.

In FIG. 11, a flowchart for the MARCH procedure invoked in steps 920, 936 and 944 of FIG. 9 is presented. This flowchart contains the high level steps performed in integrating the heat and mass transfer process equations through successive packing slices from the bottom of the packing 112 to the top of the packing. Thus, in step 1104, the heat and mass transfer coefficients for both air and water are initialized to zero. Additionally, the air side friction coefficient is also initialized to zero. Subsequently, in step 1108, a thickness for the horizontal slices through the packing which are to be integrated is chosen. Preferably, such a thickness or height is chosen to be in the range from 1 millimeter to 1 centimeter, wherein the total height of the packing 112 is about 1 meter. Thus, in step 1112, the record "PACKING_SLICE" is assigned data identifying the first slice at the bottom of the packing 112. Following this, in step 1116, the procedure "INTEGRATE_SLICE" of FIG. 12 is invoked to obtain new values for the elements of the array Y, wherein these elements will then have values corresponding to the top of the current packing slice or, equivalently, the bottom of the next slice to be integrated. Following the return of the INTEGRATE_SLICE procedure, step 1120 is encountered wherein a determination is made as to whether there is another packing slice above the current packing slice which needs to be also integrated. Assuming an additional slice exists, steps 1112 through 1120 are repeated until the top of the packing 112 is within a predetermined tolerance. When this latter condition occurs, step 1124 is encountered wherein the elements of the array Y are returned to the main program of FIG. 9.

Figure 13A:
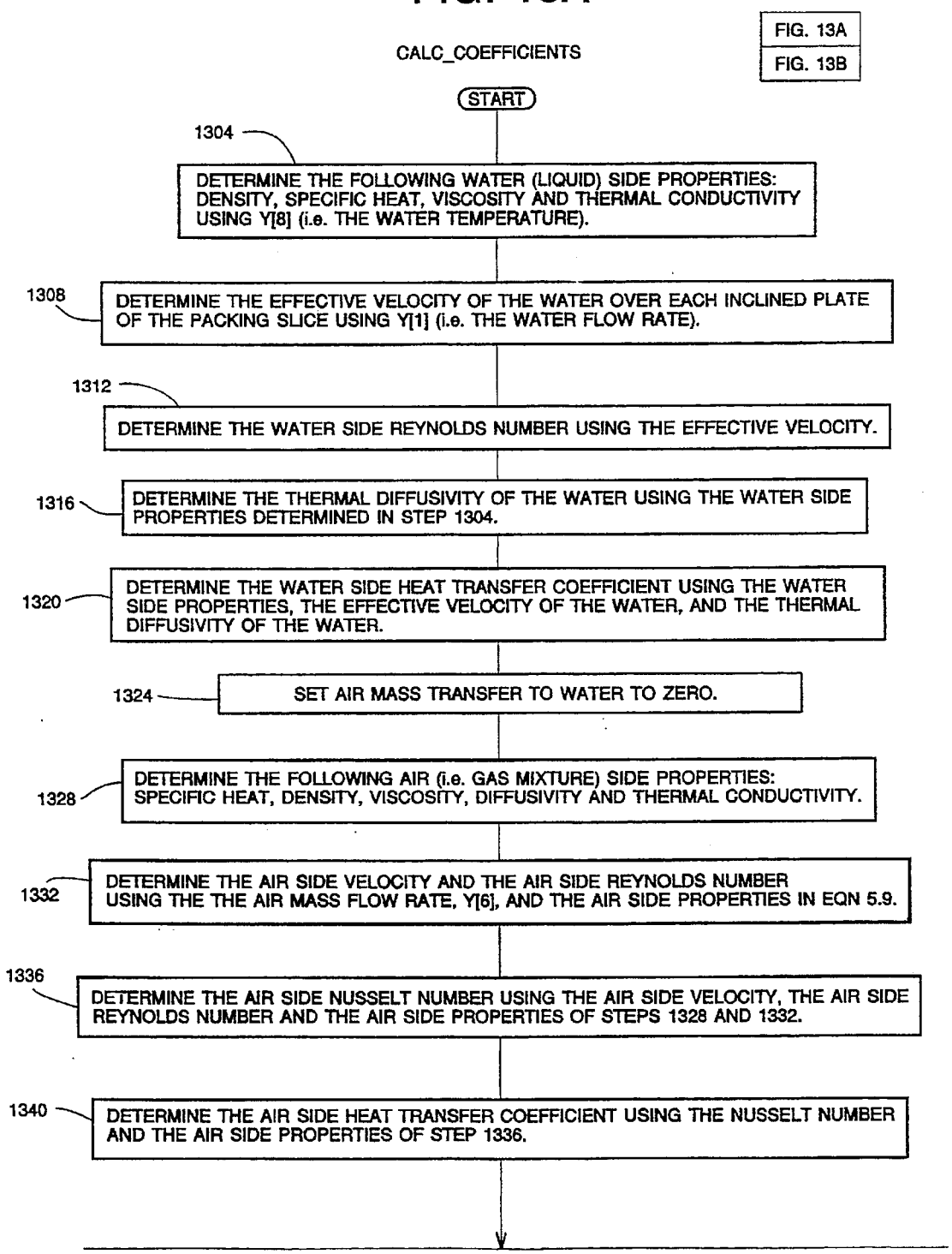
FIG. 13A is the initial portion of a flowchart for calculating the heat, mass and friction coefficients of a packing slice.
Figure 13B:
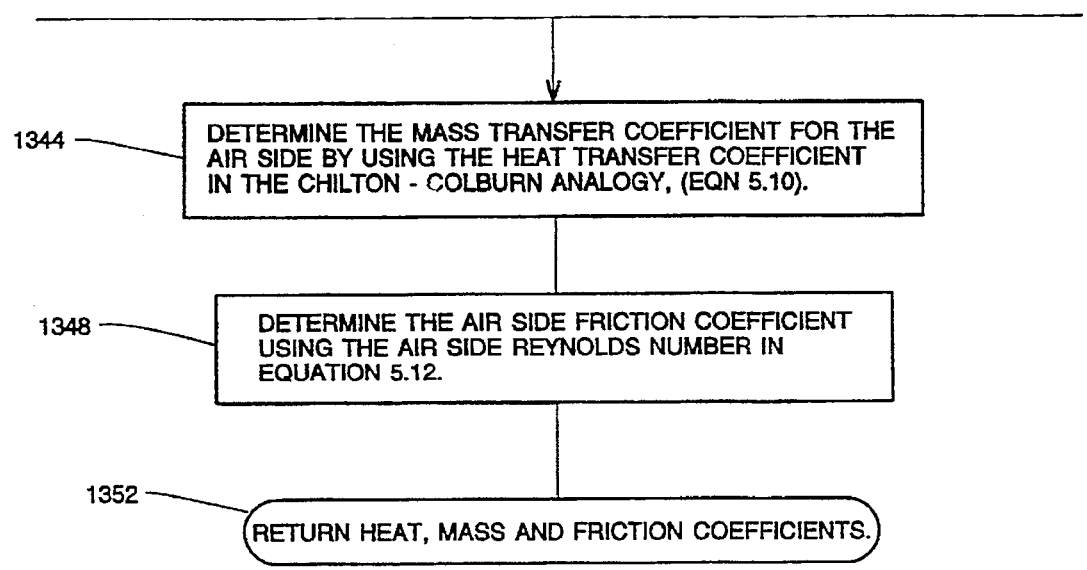
FIG. 13B is a continuation of the flowchart of FIG. 13A.
Figure 14:
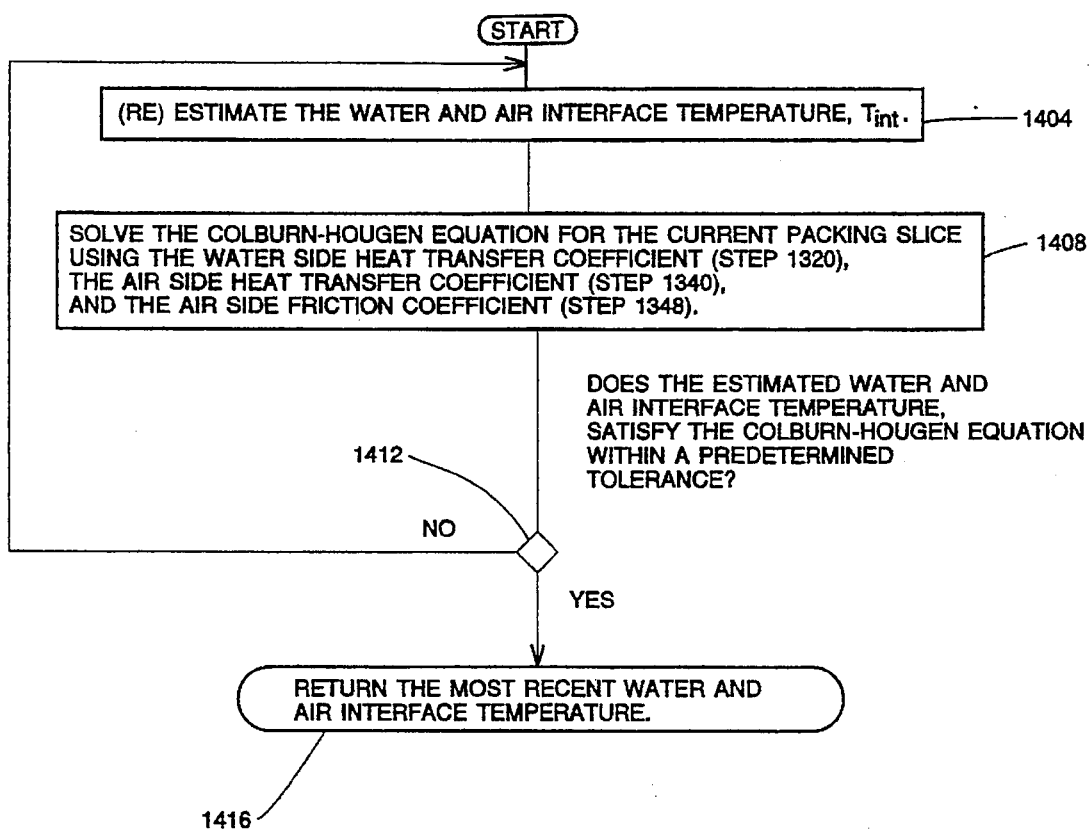
FIG. 14 is a flowchart for calculating water and air interface temperature.
Figure 15:
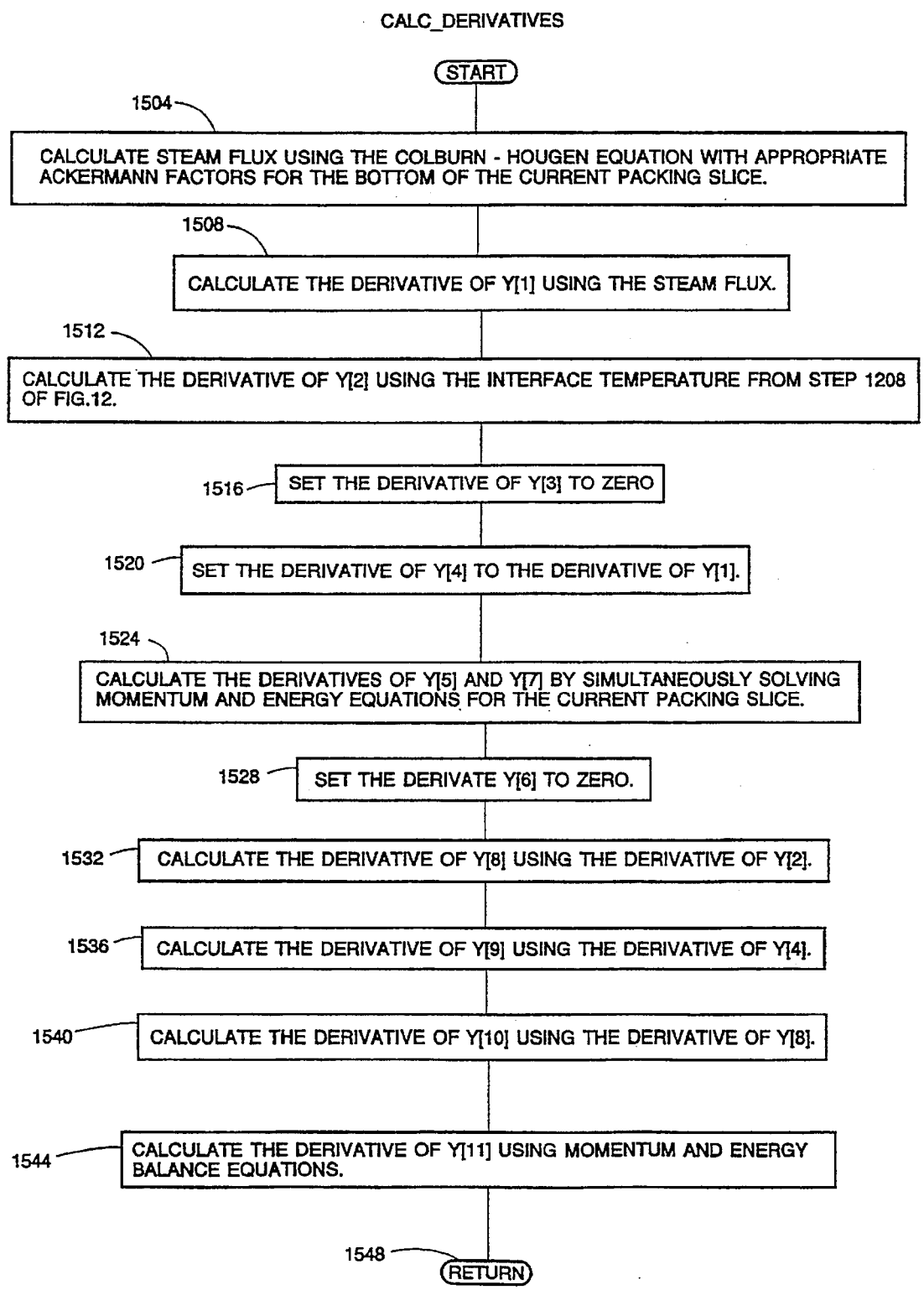
FIG. 15 is a flowchart of the steps performed in calculating derivatives of cooling tower characteristics used in integrating a packing slice.

Referring now to FIG. 12, this figure provides a flowchart corresponding to the procedure INTEGRATE_SLICE invoked in step 1116 of FIG. 11 for integrating along the height of a single packing slice to obtain new values for the array Y. Accordingly, in step 1204, the procedure CALC_COEFFICIENTS of FIG. 13 is invoked to obtain values for the heat, mass and friction coefficients for the current packing slice being integrated. Subsequently, in step 1208, the procedure CALC_INTERFACE_TEMP of FIG. 14 is invoked to obtain the water and air interface temperature, $T_{int}$. Following this in step 1212, the procedure CALC_DERIVATIVES of FIG. 15 is invoked to obtain the derivatives of the parameters Y[1] through Y[11]. Subsequently, in step 1216, the derivatives calculated in step 1212 are used to integrate each Y[I], $1 \leq I \leq 11$, along the thickness of the packing slice. Note that any number of integration procedures may be used in step 1216. However, one such preferred integrating procedure is the Fourth Order Runge-Kutta method. Following this latter step, in step 1220, the new values for the elements of the array Y corresponding to the top of the current slice are returned to the MARCH procedure of FIG. 11.

Referring now to FIG. 13, a flow chart is presented which calculates the heat and mass transfer coefficients for the water, the heat and mass transfer coefficients for the air and the friction coefficient for the air. Accordingly, in step 1304, the following water properties (for the bottom of the current packing slice) are calculated: density, specific heat, viscosity and thermal conductivity. Note that the equations cited in this step are provided in Section II below detailing additional technical aspects relating to the invention. Subsequently, in step 1308, the effective velocity of the water flowing over each inclined plate of the current packing slice is computed in a conventional manner. Following this step, in step 1312, the Reynolds number of the water is determined in a standard manner using the effective velocity computed in step 1308. Next, in step 1316, the thermal diffusivity of the water is determined in a standard manner using the water side properties determined in step 1304. Subsequently in Step 1320, the heat transfer coefficient of the water is determined by analogy to mass transfer for the diffusion of air in water. More precisely, the water side properties determined in step 1304, the effective velocity determined in step 1308 and the thermal diffusivity determined in step 1316 are used to create a diffusion model based upon the Chilton-Colburn analogy together with the use of Higbie's penetration theory for mass transfer. Following this in step 1324, since it is assumed that there is negligible mass transfer of air to the water, the air mass transfer into water is set to 0. Next, in step 1328 the air side properties for specific heat, density, viscosity, diffusivity and thermal conductivity are determined using equations 4.19, 4.21, 4.23, 4.18 and 4.24 of section II.2 respectively. Note that using the above-mentioned equations to determine the air side properties, values for the variables $X_1$ and $X_2$ are required.

These variables are calculated as follows:

$$X_1 = \frac{Y[4]}{Y[4]+Y[6]}, \text{ and}$$

$$X_2 = \frac{Y[6]}{Y[4]+Y[6]}.$$

In step 1332, the air side velocity and the air side Reynolds number are determined using the air mass flow rate ($Y[6]$) and the air side properties (step 1328). Subsequently, in step 1336, the air side Nusselt number, $Nu_{gas}$, is determined using the air side velocity, air side Reynolds number and the air side properties determined in step 1328. More precisely, the Nusselt number is determined using the following equation:

$$Nu_{gas} = 0.0338 * \exp(0.8*ln(Re_{gas})) * \exp(0.333*ln(Pr)),$$

wherein $Re_{gas}$=the Reynolds gas number, and
Pr=the Prandtl number.

Following step 1336, in step 1340, the air side heat transfer coefficient, $h_{gas}$, is determined using the following equation:

$$h_{gas} = \frac{Nu_{gas} * k_{gas}}{d_{eq}},$$

where $k_{gas}$ is the air side thermal conductivity as determined in step 1328 and $d_{eq}$ is the equivalent packing diameter.

In step 1344, the air side mass transfer coefficient is determined using the Chilton-Colburn analogy as described in equation 5.10 of section III of this description relating to the additional technical aspects of the invention. Subsequently, in step 1348, the air side friction coefficient is determined using the air side Reynolds number in equation 5.12. Finally, in step 1352, the heat, mass and friction coefficients calculated in the above steps of this flowchart are returned to the INTEGRATE_SLICE procedure in step 1204.

In FIG. 14, a flow chart is presented for calculating the interface temperature between the air and the water, $T_{int}$ in the current packing slice. Note that the Colburn-Hougen equation:

$$h_L(T_{int}-T_L) - h_G(T_G-T_{int})Ack_h - h_{fg}w_s = 0$$

where $$w_s = K_G \ln\left\{\frac{1-Y'_{s,int}}{1-Y'_s}\right\},$$

and $h_L$=liquid side heat transfer coefficient
$h_G$=gas side heat transfer coefficient
$K_G$=the gas side mass transfer coefficient
$T_L$=the temperature of the water
$T_G$=the temperature of the air
Ack=the appropriate Ackermann factor to account for the effects of high interfacial fluxes
$h_{fg}$=latent heat of condensation
$w_s$=steam flux
$Y'_{s,int}$=the mole fraction of steam at the interface between the water and the air
$Y'_s$=the mole fraction of steam of the air in the bulk away from the surfaces of the packing slice.

Accordingly, the interface temperature, $T_{int}$, cannot be calculated directly because in the Colburn-Hougen equation above $w_s$ depends on the steam mole fraction at the interface temperature in a non-linear manner. Therefore, a trial and error strategy similar to that used in the main program of FIG. 9 is used to calculate $T_{int}$.

Thus, in step 1404, an estimate of the water and air interface temperature is determined. Subsequently, in step 1408, the Colburn-Hougen equation for the current packing slice is solved. Following this in step 1412, a determination is made as to whether the estimated interface temperature satisfies the Colburn-Hougen equation within a predetermined tolerance. If the results from step 1412 indicate that the Colburn-Hougen equation is not satisfied within the predetermined tolerance then the above steps for this figure are repeated until such time as the tolerance is obtained. Once the tolerance is obtained, then step 1416 is performed wherein the most recently computed water and air interface temperature is returned to step 1208 of FIG. 12.

Referring now to the flow chart of FIG. 15 representing the CALC_DERIVATIVES procedure, this flowchart calculates the derivatives of each parameter $Y[I]$, $1 \leq I \leq 11$. Accordingly, in step 1504, the steam flux, $w_s$, for the bottom of the current packing slice is calculated using the Colburn-Hougen equation with appropriate Ackermann factors as one skilled in the art will appreciate. Subsequently, in step 1508 the derivative of the water flow rate, $Y[1]$, is determined using the above calculated steam flux. In particular, this derivative is calculated as follows:

$$Y'[1] = \frac{dm_s}{dx} = w_s C_{SA} Sa/Vol,$$

wherein x is the vertical axis along the height of the packing 112, and $\dot{m}$=the mass flow rate of the steam;
$C_{SA}$=the cross sectional area of the cooling tower 50;
Sa/Vol=the available surface area per unit volume of the current packing slice;
$W_s$=the steam flux.

In step 1512, the derivative of the cooling tower heat load, $Y[2]$, is calculated using the interface temperature from step 1208 of FIG. 12 according to the following equation:

$$Y'[2] = h_L * (T_{int}-T_L) * (Sa/Vol) * (C_{SA}).$$

Subsequently, in step 1516, the dissolved gas flow rate, $Y[3]$, is set to 0. This is done since we are neglecting any dissolved gas in the cooling tower water. Following this, in step 1520, the derivative of the steam flow rate, $Y[4]$, is set to the derivative of the water flow rate, $Y'[1]$, since the rate of change of the steam flow rate is the same as the rate of change of the water flow rate.

In step 1524, the rate of change of the dry bulb temperature, $Y'[5]$, and the rate of change of the total pressure of the cooling tower, Y'[7], are calculated. Note that these two derivatives are coupled through momentum and energy equations. Thus, these equations are solved simultaneously for each packing slice to obtain these two derivatives.

In step 1528, the derivative of the air mass flow rate, Y'[6], is set to zero. That is, the air mass flow rate inside the cooling tower 50 is presumed to remain constant because of the assumption that there are no dissolved gasses in the water.

In step 1532, the derivative of the water temperature, Y'[8], is determined by the following equation:

$$Y'[8] = \frac{dQ/dx}{m_L C_p} = \frac{Y[2]}{m_L C_{P_L}},$$

wherein $C_{P_L}$=the specific heat of the water.

In step 1536, the derivative of the partial pressure of the steam is calculated according to the following equation:

$$Y'[9] = \frac{dY[9]}{dx} = \frac{(Y[7] - Y[9])}{(Y[6] + Y[4])} \quad \frac{dY[4]}{dx} = \frac{Y[7] - Y[9]}{Y[6] + Y[4]} Y[4].$$

In step 1540, the derivative of the number of transfer units, Y'[10], is determined using the following equation:

$$Y'[10] = \frac{d(NTU)}{dx} = \frac{Y[8]}{Y[5] - Y[8]}.$$

Subsequently, in step 1544, the derivative of the fog rate, Y'[11] is calculated from momentum and energy balance equations that contain the effect of fog formation. Finally, in step 1548, the derivatives of Y[I]1≦I≦11 are returned to the INTEGRATE_SLICE procedure of FIG. 12 in step 1212.

The following description provides many of the technical details for the steps in the integration of FIGS. 10A and 10B.

II. Additional Technical Aspects Relating to FIGS. 9–15

To simulate the performance of cooling towers with structured packings, FIGS. 9–15 require the following input data:

(1.1) inlet air loading (mass flow rate, ORIG_Y[6]), inlet air dry bulb temperature (ORIG_Y[5]), inlet air humidity (ORIG_Y[4])

(1.2) structured packing geometry (see FIGS. 3–6 for more detail)

(1.3) inlet water loading (mass flow rate, ORIG_Y[1]), inlet water temperature (ORIG_Y[8]).

Assuming that all the above are uniformly distributed across the flow direction, the output information from the simulator (at the top of the packing 112) is:

(2.1) vapor and dry air flow rates (i.e., Y[4], Y[6]), air mixture dry bulb temperature (i.e., Y[5]), fog flow rate (i.e., Y[11]) and start of fog formation (2.2) outlet water temperature (i.e., OWT) and flow rate (i.e., WFR)

(2.3) cooling tower heat load (i.e., Y[2]), cooling tower total pressure (i.e., Y[9]), the number of transfer units (i.e., NTU, Y[10]).

II.1 Structured Packings

The structured packings are made of adjacent layers of corrugated sheets bound together. The sheets may be made of metallic or plastic solid sheets or gauze (wire mesh) sheets. A typical structured packing is shown in FIG. 2. A more detailed depiction of a commercially available structured packing is presented in FIG. 3. The orientation of adjacent corrugated sheets and flow channel arrangement is shown in FIG. 3. In a structured packing, water is distributed over a series of orderly placed inclined sheets. These packings provide a means to redistribute the water flow continually while providing a relatively straight forward flow path for the vapor (i.e., the moisture laden air), which alternates between triangular and diamond cross-sections along the packing. The air flow channel is at an angle θ from the horizontal. This arrangement causes the vapor and water flowing between adjacent sheets to periodically redistribute within the bed. The base of the triangle is denoted by B, height by h, and slanted side by S.

To calculate the heat and mass transfer coefficients for a typical configuration packing such as the one shown in FIG. 2, an equivalent hydraulic diameter for the vapor flow is defined as:

$$d_{eq} = \frac{4A}{P} = Bh \left( \frac{1}{B + 2S} + \frac{1}{2S} \right) \tag{3.1}$$

where A is the flow cross-sectional area and P is the wetted perimeter of the channel. Equation (1) is the arithmetic mean of hydraulic diameters of triangular and diamond shaped passages.

For packings made of solid sheets, the contact area (normally the glued or welded area between sheets) between the adjacent sheets represents a loss in available area. The thickness of the sheet causes a small but finite reduction in the available volume and void fraction. Thus the void fraction, representing the ratio of free volume to the total volume occupied by the packing, is estimated from:

$$\epsilon = 1 - 4t/d_{eq} \tag{3.2}$$

where t is the sheet thickness. If a contact loss is expressed as a percentage of total available area $C_{loss}$, then a better approximation for the available vapor flow surface area per unit volume of the packing is:

$$a_p = \left( 1 - \frac{C_{loss}}{100} \right) \frac{4\epsilon}{d_{eq}} \tag{3.3}$$

II.2 Water, Steam and Air Properties

II.2.1 Water (Coolant)

In one embodiment of the present invention freshwater properties are used with a molecular weight of 18.015. Other properties are fitted to curves as functions of temperature in degrees Celsius from data in Kellogg (M. W. Kellogg Company, 1975, *Saline Water Conversion Engineering Data Book*, U.S. Dept. of Commerce, NTIS, PB—250–907) as follows:

Density (kg/m$_3$):

$$\rho = 1000.0 - (-0.6922 - 0.001757T + 0.005571T_2) \tag{4.1}$$

for T>11.85° C.; otherwise ρ=1000.0. The temperature T is in degrees Celsius.

Specific heat (kJ/kg ° C):

$$C_p = (4217044 - 3504.25T + 113.17T^2 - 1.309T^3)/10^6. \tag{4.2}$$

Viscosity (kg/m s):

$$\mu = (2.414 * 10^{-5})10^a, \tag{4.3}$$

where $$a = \left[ \frac{0.38281}{(T + 273.15)/647.3 - 0.2163} \right]. \tag{4.4}$$

Thermal conductivity (W/m ° C.):

$$k = 0.569 + 0.001575T.$$

Schmidt number (air diffusing in water):

$$Sc = \frac{372.7\mu^2}{2.71 \times 10^{-9}(T+273.15)} \tag{4.5}$$

(Reid, R. C., J. M. Prausnitz, and B. E. Poling, 1987, *The Properties of Gases and Liquids*, Fourth Edition, McGraw Hill, New York).

These fitted curves are applicable from 2° to 40° C.

Equilibrium inert gas concentration is determined by Henry's Law. The Henry's Law constant He is a function of temperature and determined from a fitted curve of solubility (Sol), in moles air per mole water at atmospheric pressure (M. W. Kellogg Company, 1975, *Saline Water Conversion Engineering Data Book*, U.S. Dept. of Commerce, NTIX, PB—250–907) as follows:

$$Sol = (2.333 - 0.054256T + 0.00062236T^2)/10^5 \tag{4.6}$$

$$He = P_{atm}/Sol, \tag{4.7}$$

where $P_{atm}$ is atmospheric pressure (101,325 Pa).

II.2.2 Saturated Steam Properties

Saturated steam properties, including temperature, pressure, specific volume of liquid and gas, and the enthalpy of liquid and vapor, are fitted with simple equations. The saturation temperature and pressure curves are fitted to a modified Antoine equation (Smith, J. M., and H. C. Van Ness, 1959, *Introduction to Chemical Engineering Thermodynamics*, 2nd ed., McGraw-Hill, New York) with data from properties of water and steam in SI units (Schmidt, E., 1969, *Properties of Water and Steam in SI-Units*, New York, Springer-Verlag) between 0° and 40° C. The curves have the following form:

$$P_{sat} = P_1 \exp\left(P_2 - \frac{P_3}{T_{sat}+P_4}\right) + P_5 \tag{4.8}$$

and $$T_{sat} = \frac{P_3}{\left\{P_2 - \ln\left[\frac{(P_{sat}-P_5)}{P_1}\right]\right\}} - P_4, \tag{4.9}$$

where $P_{sat}$=saturation pressure (Pa)
$T_{sat}$=saturation temperature (° C.)
$P_1$=constant=161.7574
$P_2$=constant=18.4779
$P_3$=constant=4026.9759
$P_4$=constant=234.7384
$P_5$=constant=3.7383.

The specific volume of the saturated water is assumed to be constant at 0.001 m³/kg. The specific volume of the saturated gas is found using the ideal gas law.

The enthalpy of the saturated water is based on an average constant specific heat:

$$h_L = C_{P_L} T_{sat}, \tag{4.10}$$

where $h_L$=enthalpy of water (kJ/kg)
$C_{P_L}$=specific heat of water=4.186 (kJ/kg ° C.). The enthalpy of the saturated steam is found similarly as $$h_G = h_{Go} + C_{pC} T_{sat}, \tag{4.11}$$

where $h_G$=enthalpy of steam (kJ/kg)

$h_{Go}$=enthalpy of steam at 0° C.=2501.6 (kJ/kg)

$C_{pG}$=specific heat of steam=1.860 (kJ/kg ° C.).

Approximate expressions for steam transport properties valued in the range of 0° C. to 40° C. were used as follows:

Thermal conductivity (W/m K):

$$k = (1.82 + 0.006T) \ast 10^{-2} \tag{4.12}$$

Viscosity (kg/m s):

$$\mu = (8.02 + 0.04T) \ast 10^{-6} \tag{4.13}$$

Specific heat (kJ/kg K):

$$C_P = 1.854 + 0.00775T, \tag{4.14}$$

where T is in degrees Celsius (Schmidt, E. 1969, *Properties of Water and Steam in SI-Units*, New York, Springer-Verlag).

II.2.3 Air Properties

Air thermal conductivity k (W/m K):

$$k = \frac{(264.64 \ast 10^{-3}) T^{1.5}}{T + 245.4 \ast 10^{-12/T}} \tag{4.15}$$

with T in kelvins.

Air viscosity μ (kg/m s):

$$\mu = \frac{(1.458 \ast 10^{-6}) T^{1.5}}{T + 110.4} \tag{4.16}$$

with T in kelvins and a constant air specific heat $C_p$ (kJ/kg K) used as $$C_p = 1.005. \tag{4.17}$$

Air molecular weight used is 28.97 (Bolz, R. E., and G. L. Tuve, 1976, *Handbook of Tables for Applied Engineering Science*, 2nd Edition, CRC Press, Inc. Boca Raton, Fla.).

For air-water vapor mixtures, mutual diffusivity was calculated as

Molecular diffusivity (m²/s):

$$D_{12} = \frac{2.918 \, (T/313)^{1.75}}{P}, \tag{4.18}$$

where T is in kelvins, and p is the mixture pressure in Pascals.

II.2.4 Gas Mixture Properties

The gas mixture properties are calculated using the properties of the pure components, at the proper temperature and pressure, and the standard mixture rules.

If $X_1$ and $X_2$ stand for the mass fractions of steam and gas in the mixture, then the mixture properties are written as Specific heat:

$$C_P = X_1 C_{p,1} + (1 - X_1) C_{p,2} \tag{4.19}$$

Mole fraction:

$$y_1 = \frac{1}{1 + (1/X_1 - 1)(M_1/M_2)} \tag{4.20}$$

Density (kg/m³):

$$\rho = \frac{p(X_1 M_1 + X_2 M_2)}{8314.3 T} \tag{4.21}$$

Factor:

$$\phi_{ij} = [1 + (M_j/M_i)^{1/4} (\mu_i \mu_j)^{1/2}]^2 (8 + 8 M_i/M_j)^{1/2} \tag{4.22}$$

Viscosity:

$$\mu = \frac{y_1\mu_1}{y_1 + y_2\phi_{12}} + \frac{y_2\mu_2}{y_2 + y_2\phi_{21}} \quad (4.23)$$

Thermal conductivity:

$$k = \frac{y_1 k_1}{y_1 + y_2\phi_{12}} + \frac{y_2 k_2}{y_2 + y_2\phi_{21}} \quad (4.24)$$

Prandtl number:

$$Pr = C_p\mu/k \quad (4.25)$$

Schmidt number:

$$Sc = \mu/\rho D_{12}, \quad (4.26)$$

where

T = temperature (K)
M = molecular weight
Subscript 1 = water vapor
Subscript 2 = air.

III. Correlations for Heat and Mass Transfer in Structured Packings

III.1 Liquid-Side Correlations

The transfer correlations adopted here follow the approach of Bravo, Rocha, and Fair (Bravo, J. L., J. A. Rocha, and J. R. Fair, 1985, "Mass Transfer in Gauze Packings," *Hydrocarbon Processing*, pp. 91–95). However, modifications were introduced in the liquid side relations to accommodate high liquid loadings (L≈30 kg/m² s). These modifications are explained in the following paragraphs.

As shown in FIG. 7, the liquid moves down by gravity as a film along the flow channel. For packings made of solid sheets, only a fraction $a_f$ (0<$a_f$<1) of the available packing area may be effective in the transfer process. The liquid flows as a film on a surface inclined vertically, surface 400 as shown in FIG. 8, as opposed to a vertical surface. Considering that the liquid flow on the inclined surface is equivalent to an open-channel flow, Manning's formula as given in John, Z. E., and W. L. Haberman, 1980, *Introduction to Fluid Mechanics*, Englewood Cliffs, N.J.; Prentice Hall, Inc. and can be used to estimate the effective liquid-film thickness δ (i.e., 804 in FIG. 8) and the velocity for the water flow. For an inclined smooth surface, the water velocity for turbulent flow can be expressed as $$U_{L_{eff}} = \frac{0.82}{n}\delta^{2/3}(\sin\alpha)^{1/2}, \text{ m/s} \quad (5.1)$$

where

∝ = modified inclination of the surface from horizontal (708 in FIG. 7),
n = Manning roughness coefficient (=0.01 for smooth surface), and
δ = film thickness.

Using a value of 0.01 for n for smooth surfaces, the following equation is obtained $$\delta = \left(\frac{\Gamma}{82\rho_L(\sin\alpha)^{1/2}}\right)^{3/2}, \text{m} \quad (5.2)$$

where L is the superficial liquid loading (kg/m² s) flowing into cooling tower 50 via flow arrow 102, $\rho_L$ is the liquid density (kg/m³), and Γ is the water flow per unit surface area in unit length of packing given by $$\Gamma = \rho_L U_{L_{eff}}\delta = \frac{L}{a_f a_p}, \text{ kg/ms} \quad (5.3)$$

The typical distance over which liquid renewal occurs is the slanted side S modified by the inclination θ (i.e., 712 in FIG. 7) of the corrugation, or S' (i.e., 716 in FIG. 7) where $$S' = \left(\left(\frac{B}{2\cos\theta}\right)^2 + h^2\right)^{1/2} \quad (5.4)$$

and $$\sin\alpha = \frac{B}{2S'\cos\theta} \quad (5.5)$$

The local liquid-side mass-transfer coefficient, based on the penetration theory of Higbie (Higbie, R., 1935, "The Rate of Absorption of a Pure Gas into a Still Liquid During Short Periods of Exposure," Aiche Trans.) and as used by Bravo et al. (Bravo, J. L., J. A. Rocha, and J. R. Fair, 1985, "Mass Transfer in Gauze Packings," *Hydrocarbon Processing*, pp. 91–95) can then be expressed as:

$$k_L = 2\rho_L\left(\frac{D_L U_{L_{eff}}}{\pi S'}\right)^{1/2} \quad (5.6)$$

where $D_L$ = air diffusivity in water (m²/S)
$U_{L_{eff}}$ = effective liquid film velocity (m/s)
S' = distance over which liquid renewal occurs (m) (i.e., 716 in FIG. 7)
$k_L$ = liquid-side mass-transfer coefficient (kg/m² s).

The expression in Eq. (5.6) differs from that of Bravo et al. (Bravo, J. L., J. A. Rocha, and J. R. Fair, 1985, "Mass Transfer in Gauze Packings," *Hydrocarbon Processing*, pp. 91–95) in that $U_{L_{eff}}$ is based on a turbulent water flow on an inclined plane rather than laminar flow on a vertical surface; and the renewal distance is S', which is dependent on θ, as opposed to Bravo's shorter distance S, which is independent of θ.

The liquid side heat-transfer coefficient was evaluated using the Chilton-Colburn analogy (Chilton, T. H., and A. P. Colburn, 1934, "Mass Transfer (Absorption) Coefficients; Predictions from Data on Heat Transfer and Fluid Friction," *Industrial and Engineering Chemistry*, Vol. 26, pp. 1183–1187):

$$\frac{h_L}{K_L C_{p_L}} = \left(\frac{Sc_L}{Pr_L}\right)^{1/2} \quad (5.7)$$

where $h_L$ = Liquid-side heat-transfer coefficient (kW/m² K),
$K_L$ = Liquid-side mass-transfer coefficient (kg/m² s),
$C_{p_L}$ = specific heat of liquid (kJ/kg K),
$Sc_L$ = liquid Schmidt number,
$Pr_L$ = liquid Prandtl number.

III.2 Gas-Side Correlations

The local gas-side mass-transfer coefficient is based on extensive earlier investigations of wet-wall columns. Following Bravo et al. (1985), the gas Sherwood number is expressed as:

$$Sh_G = 0.0338(Re_G)^{4/5}(Sc_G)^{1/3} \quad (5.8)$$

where the Sherwood number is given by $Sh_G = k_G d_{eq}/\rho_G D_G$, the gas Reynolds number, $Re_G = d_{eq}\rho_G(U_{G_{eff}} \pm U_{L_{eff}})/\mu_G$, is based on relative velocity, and the gas Schmidt number is $Sc_G = \mu_G/\rho_G D_G$.

Here, $k_G$ represents the gas-side mass-transfer coefficient (kg/m² s), $D_G$ is the gas diffusivity (m²/s), and $\mu_G$ is the gas dynamic viscosity (kg/m s).

The effective gas velocity $U_{G_{eff}}$ is dependent on the superficial gas loading G (kg/m² s) flowing into cooling tower 50 via flow arrows 132, the void fraction of the packing ε, and the flow channel inclination θ, as given by:

$$U_{G_{eff}} = \frac{G}{\rho_G \epsilon \sin\theta} \quad (5.9)$$

The valid range for Eq. 5.8, which Bravo, Rocha, and Fair verified for structured packings, is 220<Re<2000 and 0.37<Sc<0.78. Based on previous studies, Sherwood, Pigford, and Wilke (Sherwood, T. K., R. L. Pigford, and C. R. Wilke, 1975, *Mass Transfer*, New York, McGraw-Hill) claimed a wider range of 3000<Re<40,000 and 0.5<Sc<3. Thus, it is expected that this expression is valid for a typical parameter range for a cooling tower application.

III.3 Heat Transfer.

The local gas-side heat-transfer coefficient is evaluated using the Chilton-Colburn (1934) analogy:

$$\frac{h_G}{K_G C_{pG}} = \left(\frac{Sc_G}{Pr_G}\right)^{2/3}, \quad (5.10)$$

where $h_G$=gas-side heat-transfer coefficient (kW/m² K)

$C_{pG}$=specific heat of gas (kJ/kg K)

$Sc_G$=gas Schmidt number $Pr_G$=gas Prandtl number.

III.4 Gas-Friction.

The local gas friction is modeled based on the study of Bravo, Rocha, and Fair (Bravo, J. L., J. A. Rocha, and J. R. Fair, 1986, "Pressure Drop in Structures Packing," *Hydrocarbon Processing*, pp. 45–49) who compiled Δp measurements for long stacks of structured packing where six to ten individual layers were arranged so that successive layers are rotated by 90 deg in a horizontal plane. They express the pressure loss in such a stack under dry conditions $\Delta p_o$, as $$\Delta p_o = (0.171 + 92.7/Re_s)(H/d_{eq})(\rho_G U^2_{G_{eff}}), \quad (5.11)$$

where $Re_s$ is a gas Reynolds number based on length S as $\rho_G$, $U_{G_{eff}} S/\mu_G$, and H is the total packed length.

For the model predictions, the following approximate expression for the air side "local friction" coefficient is used:

$$f = 0.171 + (92.7/Re_G) \quad (5.12)$$

in the Darcy-Weisbach equation as $$\Delta p = f \frac{L}{d_{eq}} q. \quad (5.13)$$

The foregoing discussion of the invention has been presented for purposes of illustration and description. Further, the description is not intended to limit the invention to the form disclosed herein. Consequently, variation and modification commensurate with the teachings, within the skill and knowledge of the relevant art, are within the scope of the present invention. The embodiment described hereinabove is further intended to explain the best mode presently known of practicing the invention and to enable others skilled in the art to utilize the invention as such, or in other embodiments, and with the various modifications required by their particular application or uses of the invention. It is intended that the appended claims be construed to include alternative embodiments to the extent permitted by the prior art.

What is claimed is:

1. A method for determining packing performance, comprising:

providing a set of input values, wherein there is an input value in said set for each of a plurality of parameters pertaining to a cooling tower, said parameters related to a liquid loading of said cooling tower, a gas loading of said cooling tower and geometric characteristics of a packing in said cooling tower, said geometric characteristics including at least some of: one or more dimensions of a channel in said packing and an orientation of a channel in said packing;

simulating performance of a cooling tower using said set of input values to determine a related set of output values including at least some of: outlet liquid temperature from said cooling tower, output liquid flow rate from said cooling tower, a heat load for said cooling tower and total pressure of said cooling tower;

iteratively performing said steps of providing and simulation for each set of input values from a plurality of sets of input values wherein each performance of said step of providing provides a different set of input values for said plurality of cooling tower parameters;

determining whether each set of output values is acceptable for further analysis.

2. A method, as claimed in claim 1, wherein:

the liquid is substantially water and the gas is substantially air.

3. A method, as claimed in claim 2, wherein:

said plurality of cooling tower parameters further includes cooling tower site parameters, said cooling tower site parameters including some of: an inlet air dry bulb temperature, an inlet air wet bulb temperature, inlet air pressure, an inlet water temperature and inlet water mass flow rate.

4. A method, as claimed in claim 1, wherein:

said parameters related to said one or more dimensions include a flute height, a flute base, and a flute side.

5. A method as claimed in claim 1, wherein:

said parameters related to the orientations of a channel through said packing includes an inclination angle for channel forming sheets in said packing.

6. A method, as claimed in claim 1, wherein:

said parameters related to said geometric characteristics further include a thickness for a sheet in said packing.

7. A method, as claimed in claim 1, wherein:

said output values include each of said outlet liquid temperature, said output liquid flow rate, said heat load and said total pressure.

8. A method, as claimed in claim 1, wherein:

said output values further includes at least some of a total number of energy transfer units, outlet dissolved gas flow rate, outlet moisture flow rate, outlet gas dry bulb temperature, outlet gas air mass flow rate and outlet moisture partial pressure.

9. A method, as claimed in claim 1, wherein:

said step of simulating includes integrating along a height of said packing to determine properties of a mixture of said liquid and said gas, said properties including some of:

a density, a viscosity, a diffusivity and a thermal conductivity.

10. A method, as claimed in claim 9, wherein:

said step of integrating includes processing a cross-sectional slice through said packing to determine said properties.

11. A method, as claimed in claim 10, wherein:
said step of processing includes calculating at least some of: an effective surface area for heat and mass transfer, a void fraction and a renewal length.

12. A method, as claimed in claim 10, wherein:
said cross-sectional slice has a height between 10 millimeters and 0.1 millimeters.

13. A method, as claimed in claim 1, wherein:
said liquid loading and said gas loading are in substantially opposite directions.

14. A method, as claimed in claim 1, wherein:
said step of simulating includes repeatedly integrating along the height of said packing until an output value from said set of output values is within a predetermined range of an input value from said set of input values.

15. A method, as claimed in claim 1, wherein:
said step of simulating includes determining for said packing some of: a Nusselt number, a Sherwood number and an interfacial temperature.

16. A method, as claimed in claim 1, wherein:
said step of simulating includes using Ackermann factors to account for an effect of high interfacial fluxes.

17. A method, as claimed in claim 1, wherein:
said step of simulating includes using stagnate film theory to model a diffusion of vapor from the liquid.

18. An apparatus for predicting a performance of a packing for a cooling tower, comprising:
input means for inputting a set of input values, wherein there is an input value in said set for each of a plurality of parameters pertaining to said cooling tower, said parameters related to a liquid loading of said cooling tower, a gas loading of said cooling tower and geometric characteristics of a packing in said cooling tower, said geometric characteristics including at least some of: one or more dimensions of a channel in said packing and an orientation of said channel in said packing;
prediction means for predicting a performance of said cooling tower using said set of input values to determine a related set of output values including at least some of: outlet liquid temperature from said cooling tower, outlet liquid flow rate from said cooling tower, a heat load for said cooling tower and total pressure of said cooling tower;
wherein said output values are used to determine whether said set of input values is acceptable for further analysis.

19. An apparatus as claimed in claim 18, wherein:
the liquid is substantially water, the gas is substantially air and said plurality of cooling tower parameters further includes some of: an inlet air dry bulb temperature, an inlet air humidity and an inlet water temperature.

20. An apparatus as claimed in claim 18, wherein:
said parameters related to said one or more dimensions include a flute height, a flute base and a flute side for said channel.

21. An apparatus as claimed in claim 18, wherein:
said parameters related to the orientation of said channel includes an inclination angle for a plurality of corrugated sheets forming said channel.

22. An apparatus as claimed in claim 18, wherein:
said parameters related to said geometric characteristics further include a thickness for a sheet of a plurality of sheets forming said channel.

23. An apparatus as claimed in claim 18, wherein:
said set of output values includes values for each of: said outlet liquid temperature, said output liquid flow rate, said heat load, said total pressure and a total number of energy transfer units.

24. An apparatus as claimed in claim 18, wherein:
said predicting means includes march means for marching a long a height of said packing to determine properties of a mixture of said liquid and said gas, said properties including some of: a density, a viscosity, a diffusivity and a thermal conductivity.

25. An apparatus as claimed in claim 24, wherein:
said march means includes means for iteratively processing a plurality of cross-sectional slices through said packing to determine said properties.

26. An apparatus as claimed in claim 25, wherein:
said means for iteratively processing includes means for calculating for each of said cross-sectional slices at least some of: an effective surface area for heat and mass transfer, a void fraction and a renewal length.

27. An apparatus as claimed in claim 25, wherein:
each of said cross-sectional slices has a height between 10 mm and 0.1 mm.

28. An apparatus as claimed in claim 18, wherein:
said liquid loading and said gas loading are in substantially opposite directions.

29. An apparatus as claimed in claim 18, wherein:
said prediction means includes means for marching along a height of said packing accumulating values for said set of output values, said marching being repeated until an output value from said set of output values is within a predetermined range of an input value from said set of input values.

30. An apparatus as claimed in claim 18, wherein:
said prediction means includes means for determining for said packing some of: a Nusselt number, a Sherwood number and an interfacial temperature.

31. An apparatus as claimed in claim 18, wherein:
said prediction means includes means for applying Ackermann factors to account for an effect of high interfacial fluxes.

32. An apparatus as claimed in claim 18, wherein:
said prediction means includes means for applying stagnant film theory for modeling a diffusion of vapor within the liquid.

* * * * *